US007025669B2

(12) United States Patent
Richards

(10) Patent No.: US 7,025,669 B2
(45) Date of Patent: Apr. 11, 2006

(54) ELECTRICAL TREATMENT OF CARCASSES

(75) Inventor: Ian Richards, New South Wales (AU)

(73) Assignee: Meat & Livestock Australia Limited, North Sydney (AU)

( * ) Notice: Subject to any disclaimer, the term of this patent is extended or adjusted under 35 U.S.C. 154(b) by 0 days.

(21) Appl. No.: 10/478,769

(22) PCT Filed: May 21, 2002

(86) PCT No.: PCT/AU02/00633

§ 371 (c)(1),
(2), (4) Date: Nov. 20, 2003

(87) PCT Pub. No.: WO02/094022

PCT Pub. Date: Nov. 28, 2002

(65) Prior Publication Data
US 2005/0142997 A1 Jun. 30, 2005

(30) Foreign Application Priority Data
May 21, 2001 (AU) ..................... PR5111

(51) Int. Cl.
A22C 21/00 (2006.01)
(52) U.S. Cl. .................................... 452/141
(58) Field of Classification Search ......... 452/141–144
See application file for complete search history.

(56) References Cited

U.S. PATENT DOCUMENTS

| 4,053,963 | A | * | 10/1977 | Matheu | 452/67 |
| 4,221,021 | A | * | 9/1980 | Swilley | 452/141 |
| 4,307,490 | A | * | 12/1981 | Watkins et al. | 452/128 |
| 4,358,872 | A | * | 11/1982 | VanZandt | 452/141 |
| 4,495,676 | A | * | 1/1985 | Hartmetz, II | 452/141 |
| 4,561,149 | A |   | 12/1985 | Nijhuis | |
| 4,860,403 | A | * | 8/1989 | Webb et al. | 452/58 |
| 5,512,014 | A | * | 4/1996 | Burnett | 452/141 |
| 5,888,132 | A | * | 3/1999 | Burnett | 452/141 |
| 5,899,802 | A | * | 5/1999 | Burnett | 452/141 |
| 6,290,592 | B1 | * | 9/2001 | Allen et al. | 452/58 |
| 6,364,759 | B1 | * | 4/2002 | Allen et al. | 452/141 |
| 6,796,892 | B1 | * | 9/2004 | Allen et al. | 452/106 |

FOREIGN PATENT DOCUMENTS

| EP | 090478 B1 | 9/1987 |
| FR | 2 519 846 A | 7/1983 |
| RU | 2035150 C1 | 5/1995 |
| WO | WO 90/12507 | 11/1990 |

OTHER PUBLICATIONS

International Seearch Report for Australian Patent Application No. PCT/AU02/00633; report dated Jun. 13, 2002.

(Continued)

Primary Examiner—Thomas Price
(74) Attorney, Agent, or Firm—Marshall, Gerstein & Borun LLP

(57) ABSTRACT

An animal carcass (12) being processed on a slaughter line (8) passes through various electrical current processing stations such as immobilisation (1), low voltage electrical stimulation (2), electronic bleeding (3), nerve deactivation (4), electronic back stiffening (5), and mid voltage electrical stimulation (6). The parameters of the electrical current stimulation for each process are tailored to the characteristics of each carcass or carcass type by micro computers (11) at each station. The parameters are further tailored, typically by a master computer (9), to allow for the total contribution of side effects from electrical processing at each station, to optimise the quality of meat taken from the carcass.

9 Claims, 4 Drawing Sheets

OTHER PUBLICATIONS

"Tenderising by Electrical Stimulation" Poultry International, Watt Publishing Co., Mount Morris, IL US, vol. 30, No. 3, Mar. 1, 1991, pp. 36,38.

European Search Report 02 77 1604; report dated Sep. 16, 2004.

* cited by examiner

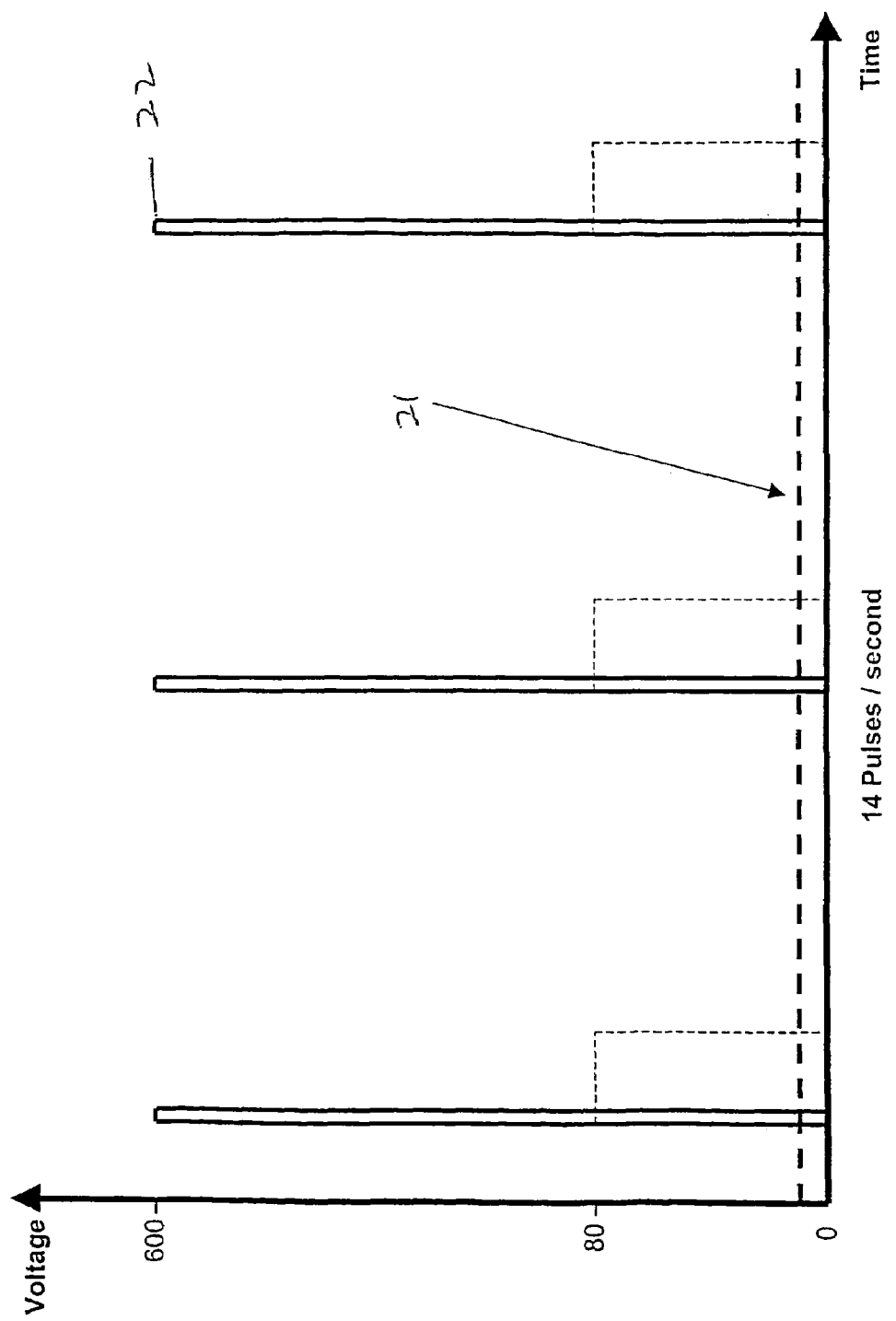

ELECTRICAL TREATMENT OF CARCASSES

FIELD OF THE INVENTION

This invention relates to the electrical treatment of carcasses and has been devised particularly though not solely for improving the quality of meat from animal carcasses processed on a slaughterhouse line.

BACKGROUND OF THE INVENTION

The processing of animal carcasses on an abattoir or slaughterhouse line has traditionally been a mechanical operation wherein the animals are killed by stunning, either with a captive bolt gun or by electrical stunning, and then cutting the throat of the animal. The carcass is then hung from a processing line and moved through a number of sequential processing stations for bleeding, hide removal, evisceration, fat trimming, boning, and other operations for the preparation of desired carcass end form. The processed carcasses are then normally placed in a cold room for refrigeration.

In the past, it has been known to apply electrical treatment to a carcass at different points on the slaughterhouse line and for different reasons. For example, it is known to apply low voltage electrical stimulation (LVES) using electrodes to apply a train of current pulses to each carcass early in the slaughtering process. This can accelerate the onset of rigor mortis which reduces "cold shortening" under refrigeration and speeds up the natural ageing (tenderising) process. Eliminating "cold shortening" and accelerating the natural ageing process can dramatically improve the tenderness of meat consumed early after slaughter.

It is also known to provide Electrical Immobilisation (EI) to the carcass in the slaughtering process. This temporarily immobilises the nervous system and reduces OH&S risk.

It is also known to apply Electronic Bleeding (EB) to the carcass in the early part of slaughter. This activates the nerve/muscle system to enhance the bleed out of the carcass.

It is also known to apply Nerve Deactivation (ND) to the carcass before carcass dressing begins. This permanently disables the nerves and eliminates any future OH&S risk.

It is also known to provide electrical back stiffening (EBS) in combination with hide pullers to stiffen the carcass back muscles while the hide is being removed and lessen the chance of the spine breaking.

It is also known to apply high voltage electrical stimulation (HVES) to the carcass towards the end of the slaughtering process. This activates the muscles directly (the nerves have since died) and creates similar meat tenderising effects as the LVES.

The electrical treatment applied to a carcass at one particular station on the processing line to achieve a particular effect may also induce side effects which are detrimental to later processing steps. The side effects, particularly the electrical stimulating effect is summative so that the small side effects from each electrical technology, while not detrimental alone, all add to give a combined effect which may be undesirable. This results in a loss of potential quality in the end product and may also make downstream processing more difficult or hazardous to the operator.

SUMMARY OF THE INVENTION

The present invention therefore provides a method of processing carcasses on a slaughterhouse line having a plurality of processing stations, including the steps of: applying electrical current to selected parts of a carcass at two or more of said stations, the parameters of the electrical current application at each station being determined by the processing needs of that station:

and tailoring said parameters of at least one station, including allowing for the cumulative effect of current application at one or more other stations, to produce an optimised quality in meat taken from the carcass.

Preferably said parameters are tailored to the characteristics of the carcass presented at that station.

Preferably the characteristics of a carcass entered into the computer to tailor said parameters include one or more of: carcass electrical responsiveness, carcass biochemical parameters, muscle glycogen, carcass type, and carcass weight.

Preferably said parameters are tailored allowing for the total contribution of side effects from each station.

Preferably the parameters of electrical current application at each station are set using a computer.

Preferably the tailoring of parameters at two or more stations is performed by a master computer sending control signals to the computers at those stations.

Preferably the parameters include one or more of: peak current, voltage, pulse width, frequency, modulation frequency and mark to space ratio, current ramp up time, and interval timing.

Preferably the computer tracks the progress of each carcass on the slaughterhouse line, tailoring the parameters of the electric current applied to a specific carcass at a specific station to the characteristics of that carcass and the processing needs of that station.

Preferably the electric current applied at selected processing stations has parameters determined to achieve processing steps or facilities selected from the following group:

electronic stunning to replace conventional captive bolt stunning methods;

immobilisation to temporarily prevent or reduce nerve reflex action;

low voltage electrical stimulation to control muscle shortening and ageing rate;

electronic bleeding to increase blood yield and reduce bleeding duration;

nerve deactivation for carcass immobilisation and permanent, rapid nerve destruction;

electronic back stiffening for controlled contraction of carcass muscles during hide pulling;

mid voltage electrical stimulation on both carcass muscles and nerves towards the end of the slaughter process when most nerves have died;

high voltage electrical stimulation to act directly on carcass muscles at the end of the slaughter process.

BRIEF DESCRIPTION OF THE DRAWINGS

Notwithstanding any other forms that may fall within its scope, one preferred form of the invention will now be described by way of example only with reference to the accompanying drawings in which:

FIG. 4 is a similar graph to FIG. 3 showing the effect of increasing pulse voltage.

DETAILED DESCRIPTION OF PREFERRED EMBODIMENTS OF THE INVENTION

In the preferred form of the invention, electrical activation is applied to meat carcass for example beef, goat or sheep carcass on a slaughterhouse line, but it will be appreciated that the invention can be applied to other forms of animal or bird carcass in various other abattoir type operations.

Figure 1:
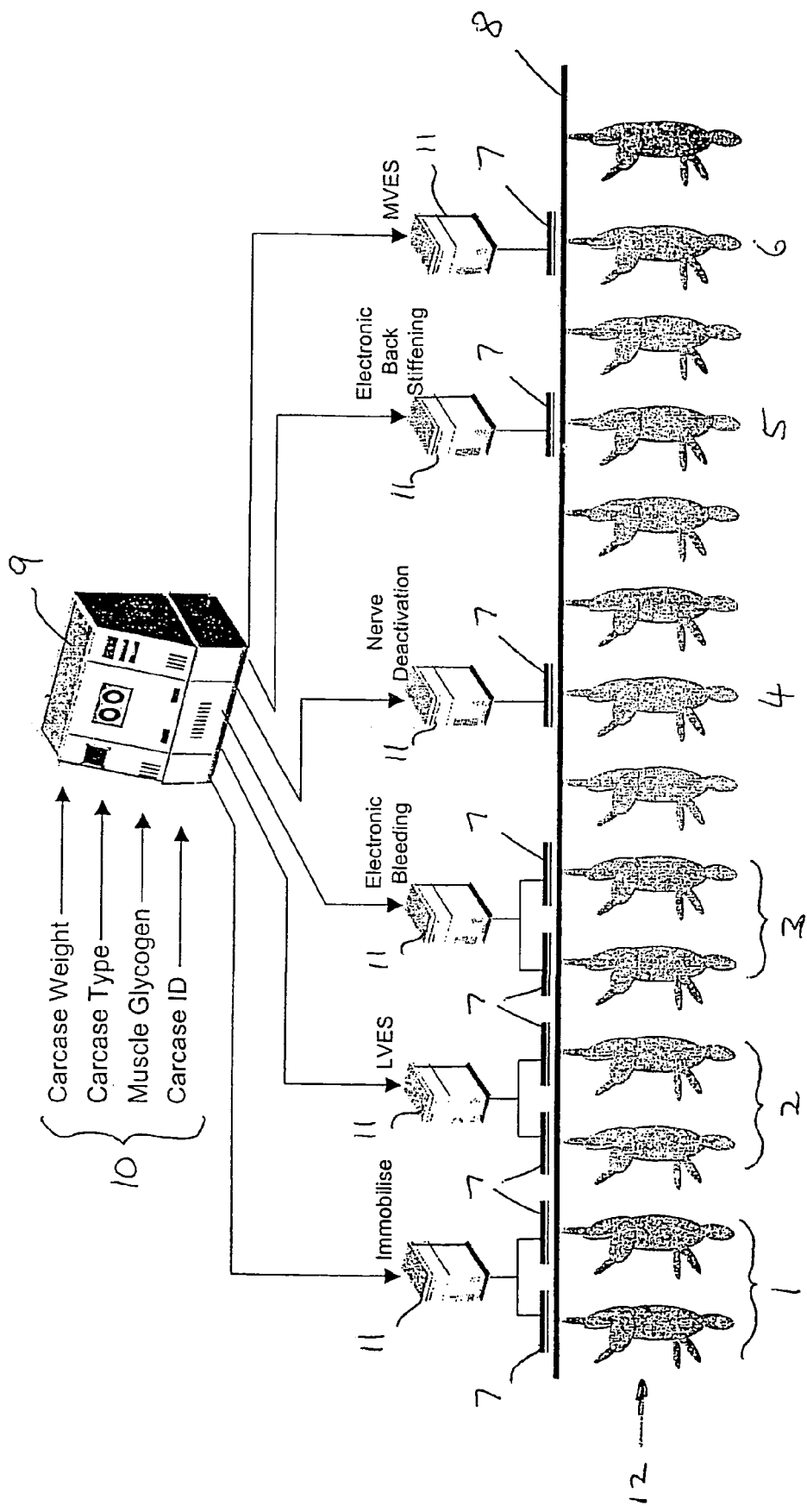
FIG. 1 is a diagrammatic representation of a slaughter line showing control of various electrical activation steps according to the invention.

An animal (12) to be processed in a slaughterhouse typically passes through a number of processes such as immobilisation (1), low voltage electrical stimulation (2), bleeding (3), nerve deactivation (4), back stiffening (5), and mid voltage electrical stimulation (6) among other processes which may include fat trimming, boning, high voltage electrical stimulation, and other well known processes. It should be appreciated that the processes and situations represented in FIG. 1 are illustrative examples only and do not comprise an actual slaughterhouse line, or would necessarily be used in the illustrated sequence or combination.

In some processing areas, electrical activation is applied to the carcass (12) either by attaching electrodes at predetermined points on the carcass, or by sliding the carcass along electrically conducting contact bars or rails such as those diagrammatically shown at (7) on the production line (8). Various forms of controlled electronic pulses can then be applied to the carcass at different stages to achieve a desired result. The parameters of the electronic pulses which are typically controlled include, peak current, voltage, pulse width, frequency, modulation frequency and mark to space ratio, current ramp up time and interval tiring.

The electronic pulses may be applied to achieve a number of desired effects at different stations on the slaughterhouse line including the following:

(a) Immobilisation
  electronic control of the peak current, the duration of immobilisation, pulse width and frequency.
  prevents carcass nerve reflex action while operations such as sticking or shackling take place. A temporary effect while energy is applied.
  low level, relatively "safe", voltage allows human contact with immobilised carcass without appreciable danger.
  uses "dose control" technology to eliminate over dosing. Muscle damage such as bruising or blood spotting can occur from too higher dose.
  degree of "dose" may be adjusted to match the carcass.
  minimises unwanted stimulation effects by using electronic parameters which minimise stimulation but maximise immobilisation effects.
  does not cause rapid nerve death but does cause some small degree of stimulation effect.

(b) Low Voltage Electrical Stimulation (LVES)
  electronic control of the peak current, the duration of stimulation, pulse width and frequency.
  uses "dose control" technology which applies an exact, predetermined peak current pulse to each carcass for a set time giving precise control over the amount of stimulation.
  degree of "dose" may be adjusted to match the carcass.
  The stimulation level controls the rate of rigor mortis onset (measured by the rate of pH fall in muscle) and the rate of subsequent ageing of the muscle. This enables control over the degree of "cold shortening" and the tenderness of consumed meat.
  frequency adjustable to minimise "setting of joints" on some carcass types.
  has a small, permanent immobilisation effect on nerves.
  uses "safe" low voltage, no special exclusion zones required and operation is relatively safe for operators.
  application early in the process using automatically applied electrodes.

Figure 2:
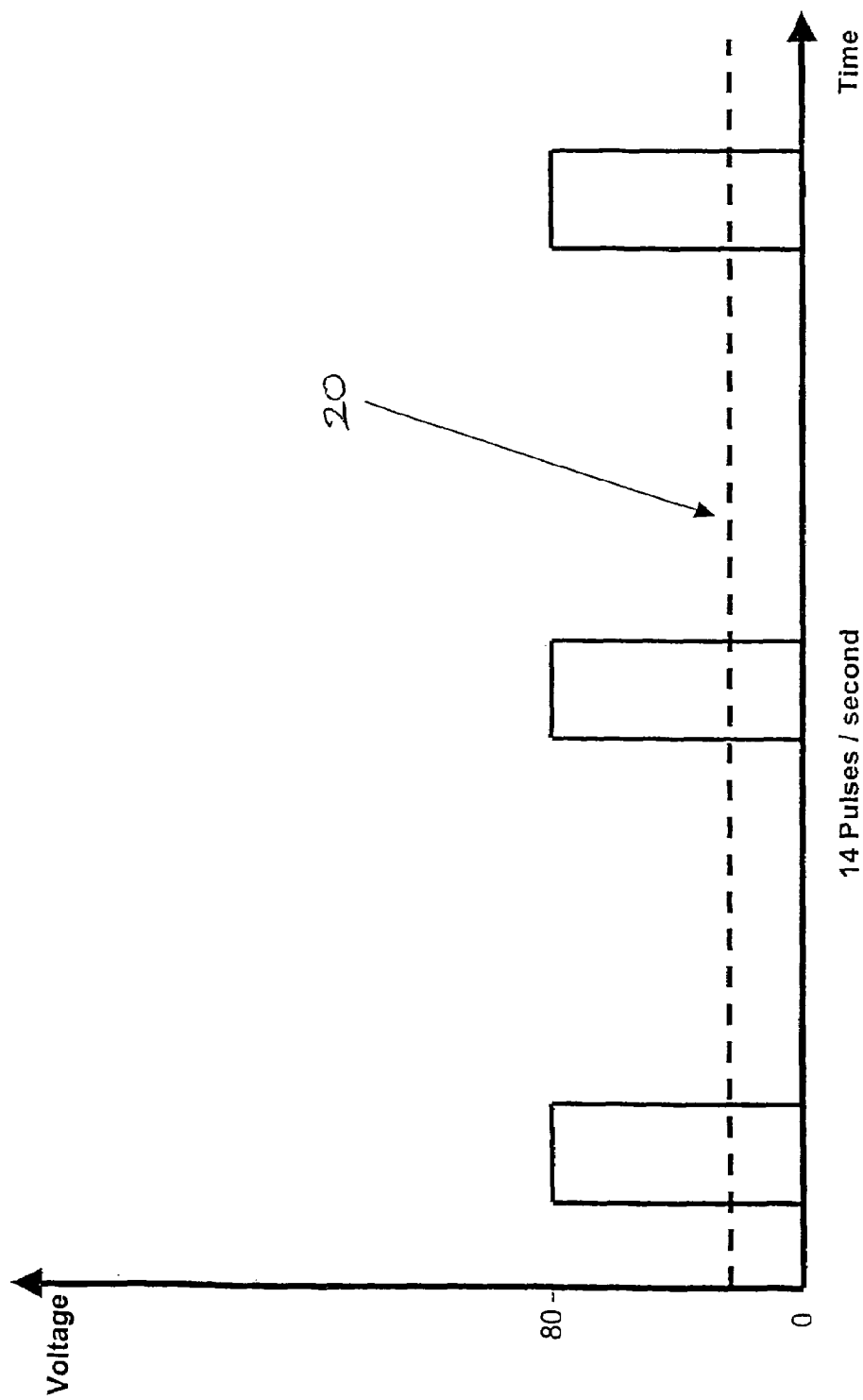
FIG. 2 is a graph of low voltage electrical stimulation as applied in conventional technology.
Figure 3:
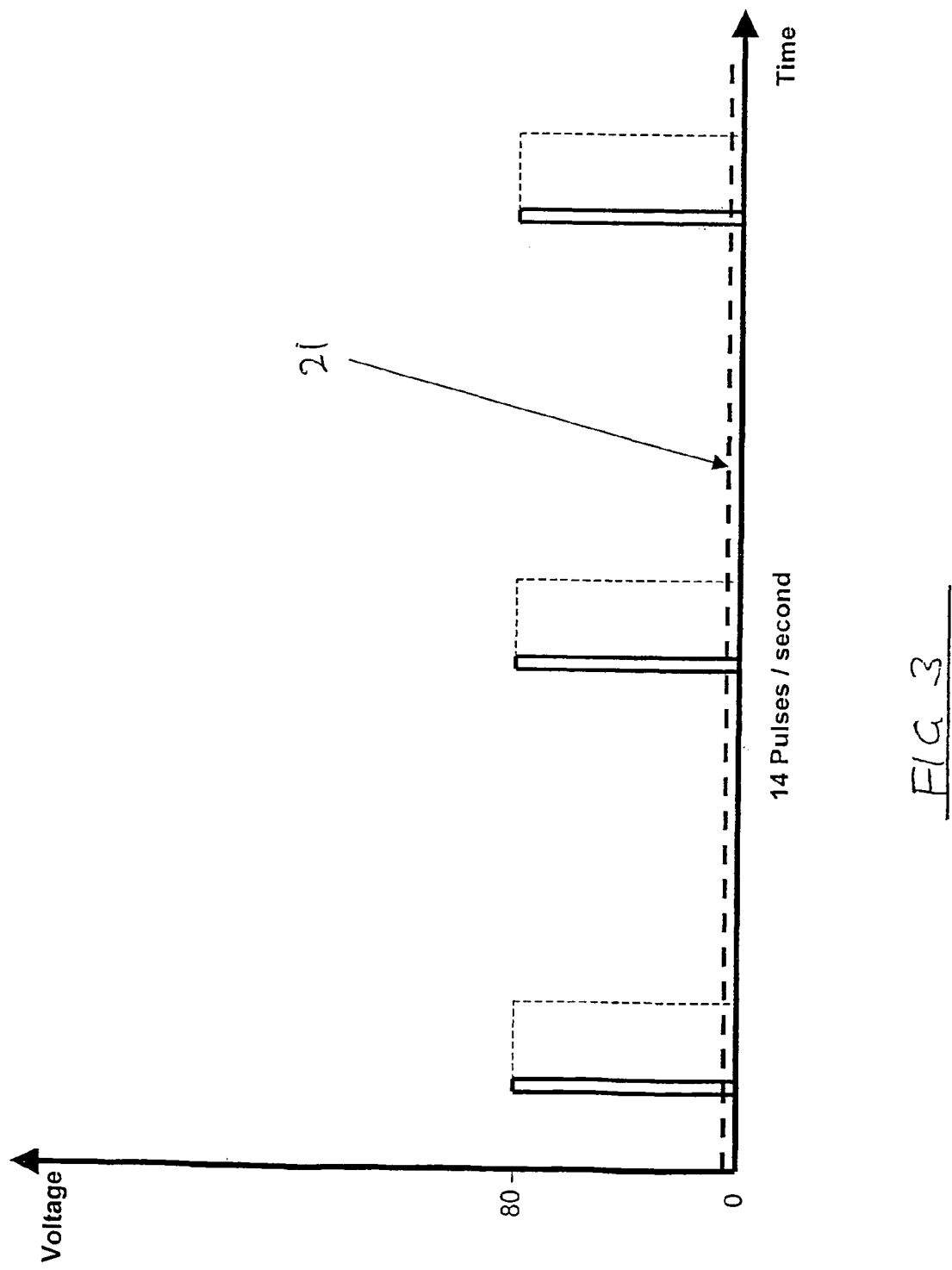
FIG. 3 is a similar graph to FIG. 2 showing the effect of reducing pulse width.

The effect of tailoring the pulse width can be seen in a comparison of FIGS. 2 and 3 where FIG. 2 shows typical pulses applied in known technology resulting in "equivalent voltage" (20) for safety calculations. By reducing the pulse width as shown in FIG. 3, the equivalent voltage is significantly reduced without any significant loss in the effect of the pulses on the carcass. This then allows the voltage of each pulse to be increased to level (22) as shown in FIG. 4 without increasing the equivalent "safety" voltage to or above the level (20) (FIG. 2) in the original technology.

This is given as an example only of how the parameters of electrical current application at a processing station may be determined to suit various processing or safety requirements. The parameters may then be tailored in the knowledge of parameters to be applied at other processing stations to optimise overall meat quality.

(c) Electronic Bleeding
  electronic control of the peak current, the duration of bleeding, mark and space of the modulation, pulse width and frequency.
  increases the blood yield during bleeding by electronically pumping extra blood from the carcass.
  improves the meat and fat colour and improves the keeping quality of the meat by more effectively draining the tissues of blood.
  lowers the blood contamination of the slaughter floor and lowers the BOD and nitrogen loadings of the waste water treatment plant.
  applied in conjunction with the LVES or Immobilisation in the bleed area.
  degree of "dose" may be adjusted to match the carcass.

(d) Nerve Deactivation
  immobilises the carcass but also rapidly destroys the nerve so the carcass becomes permanently immobilised or immune to reflex action.
  has only a very small stimulation effect but must be balanced with the other electronics inputs.
  useful if carcass workup is to take place soon after slaughter when the normally active nerves would hinder work.
  other electronics inputs which rely on the nerves for effect will no longer work after this is applied so this technology is usually the last technology applied in the early part of the process line.
  degree of "dose" may be adjusted to match the carcass.

(e) Electronic Back Stiffening
  electronic dose control of the peak energy.
  energy can be tailored to the carcass type to prevent excessive muscle contraction (and damage) in small carcass and grain fed carcass.

(f) Mid Voltage Electrical Stimulation (MVES)
  same features as LVES except the energies are higher than LVES and more care must be taken with the safety of the installation.
  applied at the end of the slaughtering process when many nerves are inactive and higher energy is needed to activate the muscle directly.
  degree of "dose" may be adjusted to match the carcass.
  integrates with LVES to balance the proportions of the different stimulations.
  makes boning on the curve and hot boning more efficient.

In order to achieve the maximum efficacy of the electronic activation at any desired step, the parameters referred to above are optimised based on measurements of the carcass characteristics using scientific modelling in order to achieve the desired output. These parameters are tailored to suit the characteristics of a particular carcass being treated at that time. Important characteristics include carcass electrical response, carcass biochemical parameters, muscle glycogen levels, carcass type, and carcass weight. These characteristics are fed into a master computer (9) as various inputs (10). Based on algorithms for matching these carcass characteristics with desired electrical pulse parameters, the master computer (9) then sends control signals to microcomputers (11) set up to control the application of electrical pulses at each of the processing stations.

As the effect on a carcass through optimal electronic pulses for processing at a particular station may have a deleterious effect on the carcass when combined with effects at a subsequent processing station (whether by electrical pulses or otherwise) the computer is programmed with algorithms to tale account of the interaction between the various electrical activation stages and to optimise the tailoring of the parameters at each stage to minimise the disadvantageous effect of the interactions between processing from all the stations.

The master computer (9) is also set up to follow the progress of each carcass through the process line, adjusting the parameters of each station in turn by tailoring the parameters of the electric current applied to a specific carcass at a specific station to the characteristics of that carcass and the processing needs of that station while taking into account other station requirements.

In a simpler form of the invention, the master computer may be omitted and the individual micro computers (11) used to store the required parameters for each processing station. These parameters are then tailored sequentially by plant operators to suit carcass characteristics. The same effect is achieved as having a centralised computer as all the parameters of all the processing stations are still determined in total, allowing for the interactions between processes— the common thread is scientifically determining the parameter sets for all (or selected) processes and using some form of intelligence, human or computer to sequentially change the parameters on individual processes.)

In this manner, a method of processing carcasses on a slaughterhouse line is provided which not only enables electrical activation to be applied using known techniques, but opens up the application of electrical activation in other processes and enables the quality of the end product and the time for processing to be optimised according to the characteristics of each individual carcass.

What is claimed is:

1. A method of processing carcasses on a slaughterhouse line having a plurality of processing stations, comprising:
    applying electrical current to selected parts of a carcass at two or more of said stations, the parameters of the electrical current application at each station being determined by the processing needs of that station; and
    tailoring said parameters of at least one station, including allowing for the cumulative effect of current application at one or more other stations, to produce an optimized quality in meat taken from the carcass.

2. A method as claimed in claim 1 wherein said parameters are tailored to the characteristics of the carcass presented at that station.

3. A method as claimed in claim 2 wherein the characteristics of the carcass include one or more of: carcass electrical responsiveness, carcass biochemical parameters, muscle glycogen, carcass type, and carcass weight.

4. A method as claimed in claim 1 wherein said parameters are tailored allowing for the total contribution of side effects from each station.

5. A method as claimed in claim 1 wherein the parameters of electrical current application at each station are set using a computer.

6. A method as claimed in claim 5 wherein the tailoring of parameters at two or more stations is performed by a master computer sending control signals to the computers at those stations.

7. A method as claimed in claim 1 wherein the parameters include one or more of: peak current, voltage, pulse width, frequency, modulation frequency and mark to space ratio, current ramp up time, and interval timing.

8. A method as claimed in claim 1 wherein the computer tracks the progress of each carcass on the slaughterhouse line, tailoring the parameters of the electric current applied to a specific carcass at a specific station to the characteristics of that carcass and the processing needs of that station.

9. A method as claimed in claim 1 wherein the electric current applied at selected processing stations has parameters determined to achieve processing steps or facilities selected from the following group:
    electronic stunning to replace conventional captive bolt or electrical stunning methods;
    immobilization to temporarily prevent or reduce nerve reflex action;
    low voltage electrical stimulation to control muscle shortening and ageing rate;
    electronic bleeding to increase blood yield and reduce bleeding duration;
    nerve deactivation for carcass immobilization and permanent, rapid nerve destruction;
    electronic back stiffening for controlled contraction of carcass muscles during hide pulling;
    mid voltage electrical stimulation on both carcass muscles and nerves towards the end of the slaughter process when most nerves have died; and
    high voltage electrical stimulation to act directly on carcass muscles at the end of the slaughter process.

* * * * *